United States Patent [19]

Lee

[11] Patent Number: 5,844,401
[45] Date of Patent: Dec. 1, 1998

[54] CHARGING DEVICE FOR EASY MOUNTING/DISMOUNTING OF A BATTERY

[75] Inventor: Il-Kwon Lee, Suwon-si, Rep. of Korea

[73] Assignee: SamSung Electronics Co., Ltd., Suwon, Rep. of Korea

[21] Appl. No.: 857,512

[22] Filed: May 16, 1997

[30] Foreign Application Priority Data

May 16, 1996 [KR] Rep. of Korea ................... 1996-16391

[51] Int. Cl.$^6$ ................................................. H01M 10/46
[52] U.S. Cl. ........................................... 320/107; 320/112
[58] Field of Search ..................................... 320/107, 112, 320/113, 114, 101; 429/96, 97, 98, 99, 100; D13/103, 107, 108

[56] References Cited

U.S. PATENT DOCUMENTS

| | | | |
|---|---|---|---|
| 3,881,961 | 5/1975 | Nation | 136/173 |
| 5,248,569 | 9/1993 | Pine et al. | 429/97 |
| 5,394,073 | 2/1995 | Nagai | 429/96 X |
| 5,634,815 | 6/1997 | Inazuka et al. | 429/97 X |
| 5,716,730 | 2/1998 | Deguchi | 429/97 |

*Primary Examiner*—Edward Tso
*Attorney, Agent, or Firm*—Robert E. Bushnell, Esq.

[57] ABSTRACT

A portable battery recharger, together with the battery, provides a secure connection between the battery and the recharger when the battery is being recharged. A locking groove formed on the side of the battery and a rotatable locking member hold the battery in place during recharging. A sliding slide with a grip is used to operate the locking member so as to disengage the battery when recharging is complete. A door is formed over the enclosure of the recharging case when the battery is not being recharged. Upon insertion of the battery into the recharger, the door opens to accommodate the battery. The charging device and the battery in accordance with this invention strengthens the force of attachment between the battery to the charging device. The door to the charging device prevents dust from entering the case of the charging device when the battery is not mounted.

8 Claims, 4 Drawing Sheets

CHARGING DEVICE FOR EASY MOUNTING/DISMOUNTING OF A BATTERY

CROSS REFERENCE TO RELATED APPLICATION

This application makes reference to, incorporates the same herein, and claims all benefits accruing under 35 U.S.C. §119 from applications for a Charging Device for Easy Mounting/dismounting of a Battery earlier filed in the Korean Industrial Property Office on 16 May 1996, and there duly assigned Ser. No. 96-16391.

FIELD OF THE INVENTION

The present invention relates generally to charging devices for a rechargeable battery used in portable devices, and more particularly, to a charging device having a locking apparatus for easily mounting or dismounting a battery.

BACKGROUND OF THE INVENTION

In earlier battery rechargers, the battery rested on top of the recharger and is docked onto the recharger for recharging. A small projection from the recharger clips into the groove of the battery to hold the battery in place.

If the earlier charging device was used for a long time, the projection may be broken because of the weak durability of the projection. If an impact is given to the charging device when a battery is mounted, the battery may slide back away from the portion of the case and the terminal thereby allowing dust to enter the case through the space between the case 16 and the terminal.

SUMMARY OF THE INVENTION

It is an object to provide a charging device with a locking apparatus that allows a battery to be easily mounted to and dismounted from a battery recharging case through the use of a latch with an elastic member.

It is another object to provide the charging device with a door in order to prevent dust from entering the battery recharging case when a battery is not inserted into the charging device.

These and other objects may be achieved by a battery case and a battery having a charging means, installed in the case, for controlling the charging operation of the battery by converting power from an alternating current source AC to a direct current DC power signal and supplying the DC power to the battery, a locking member, installed on the side of the case, which engages and disengages the locking groove formed on the side of the battery by rotating and restoring at a predetermined angle by an external force, a elastic member which is installed between the locking member and the case, and exerts a force so that the locking member engages the locking groove of the battery, and a sliding part which contacts the locking member so that the force of the user may be transmitted to the corner of the locking member and the locking member may induce the rotatory power to the corner.

The present invention further includes a door attached to the front panel of said case which rotates upwardly when a battery is mounted into the charging device, and a door spring installed between the back side of the door and the surface of the case which exerts a force so that the door may close when a battery is dismounted from the charging device.

If the battery is inserted into the charging device and the locking groove of the battery reaches near the locking member, the locking member rotates at a predetermined angle. If the user applies a force to the battery so that the locking member may reach the locking groove exactly, the battery is fixed to the charging device when the locking member engages the locking groove.

The user pushes the sliding part so as to separate the battery from the charging device. The locking member connected to the sliding part rotates so as to oppose to the force of the spring. So, the battery is separated. When the locking member engages the locking groove, the battery is settled more tightly to the charging device because the spring adds a force to the locking member. The charging device as constructed in accordance with this invention strengthens the force settling the battery and the is battery is separated from the charging device simply by sliding the sliding part.

If the user pushes the battery contact through the door in the forward direction, the door opens by rotating in the upper internal direction of the case. Also, the present invention provides a door to the charging device for preventing dust from entering the case of the charging device when a battery is not mounted.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
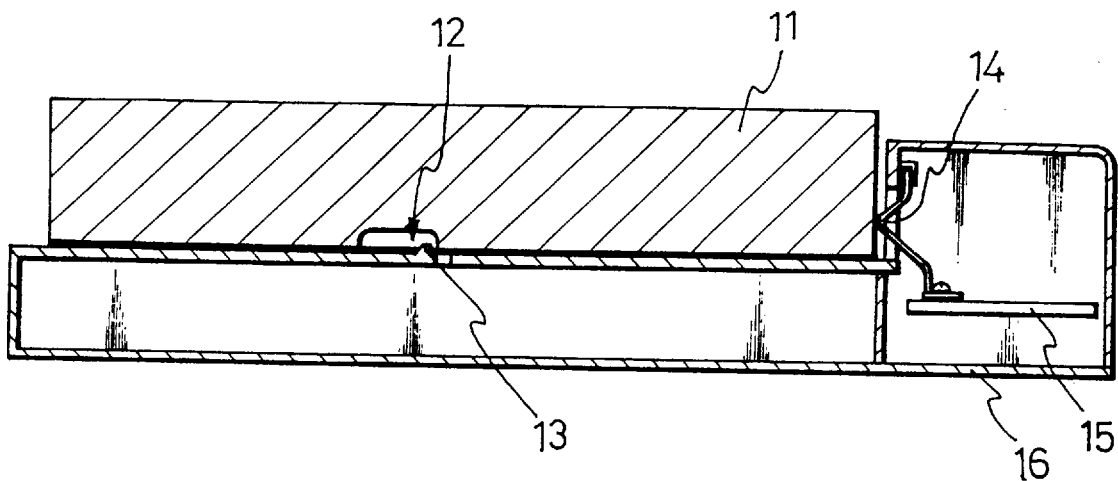
FIG. 1 is a side cross-sectional view showing a battery mounted in a hypothetical representation of an earlier design for a charging device.
Figure 2A:
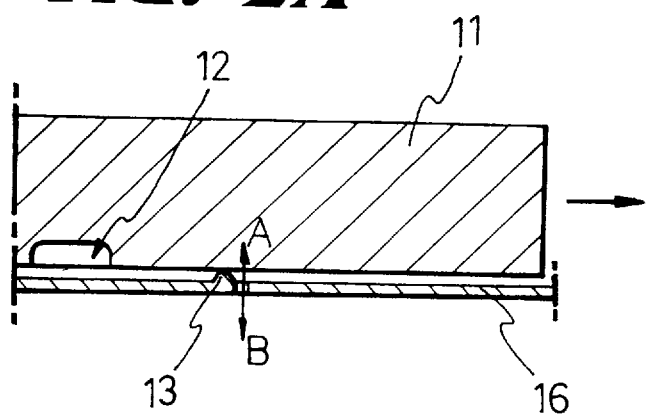
FIGS. 2A and 2B are side cross-sectional views showing important parts of the earlier charging device shown in FIG. 1 when mounting and separating the battery respectively.
Figure 2B:
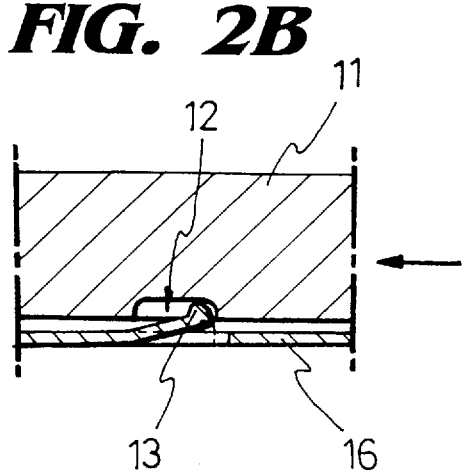

A earlier invention will be explained with reference to the accompanying drawings. FIG. 1 is a side cross-sectional view showing a battery mounted to an earlier charging device. FIGS. 2A and 2B are side cross-sectional views showing important parts of the charging device shown in FIG. 1 when mounting or separating a battery. As shown in FIG. 1, an earlier charging device includes a case 16, a projection 13 which is formed on a contact surface of the case 16, a battery 11, a terminal 14 which contacts an electrode terminal of the battery 11 when the battery 11 is mounted to the charging device and a charging circuit board 15 which is connected to the terminal 14 and is fixed in the case 16. A groove 12 is formed on the bottom of the battery 11 and engages the projection 13.

The charging circuit board 15 supplies power to the battery 11 after converting a commercial AC (alternating current) power to a DC (direct current) power. Accordingly, the charging operation of the battery is controlled.

The process of mounting the battery 11 to an earlier charging device will be described with reference to FIG. 2A. As shown in FIG. 2A, the battery 11 is positioned on the top of the case 16. The groove 12 reaches the position of the projection 13 when an user pushes the battery 11 in the direction indicated by the arrow. Accordingly, the projection 13 engages the groove 12. The projection 13 can be engaged with the groove 12 easily because of the elasticity to be restored in the 'A' direction. The battery 11 is attached to case 16 by the projection 13 and the terminal 14 as shown in FIG. 1.

The process of dismounting battery 11 from an earlier charging device will be described with reference to FIG. 2B. The projection 13 slides on a boundary surface of the groove 12 when the user pushes the battery 11 in the direction indicated by the arrow as shown in FIG. 2B. Accordingly, the projection 13 moves in the lower direction as shown by the dotted line of FIG. 2B and the battery 11 is separated from the charging device.

Figure 3A:
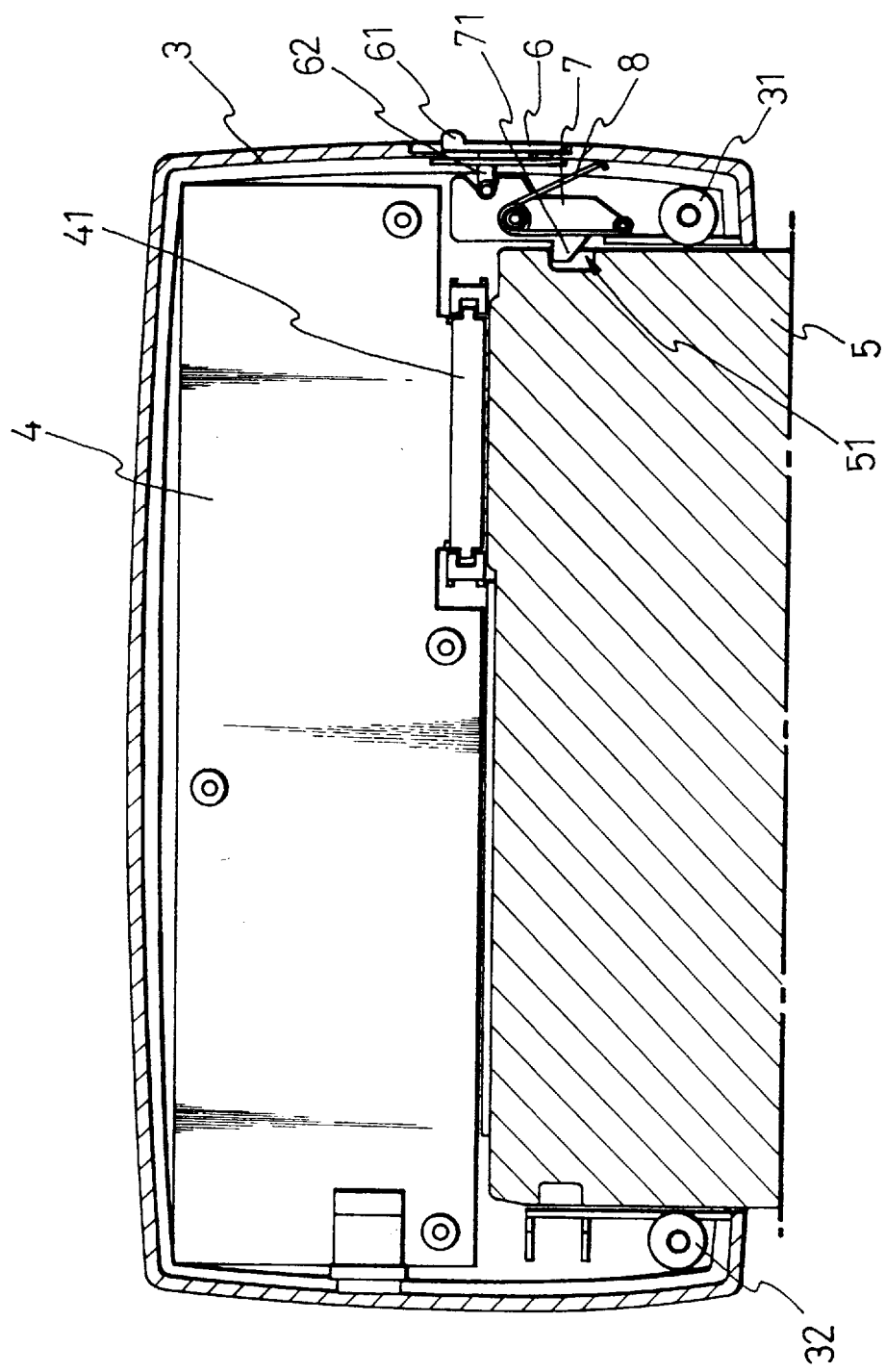
FIGS. 3A and 3B are top cross-sectional views showing a charging device as constructed in accordance with a preferred embodiment of the present invention when mounting and dismounting a battery respectively.
Figure 3B:
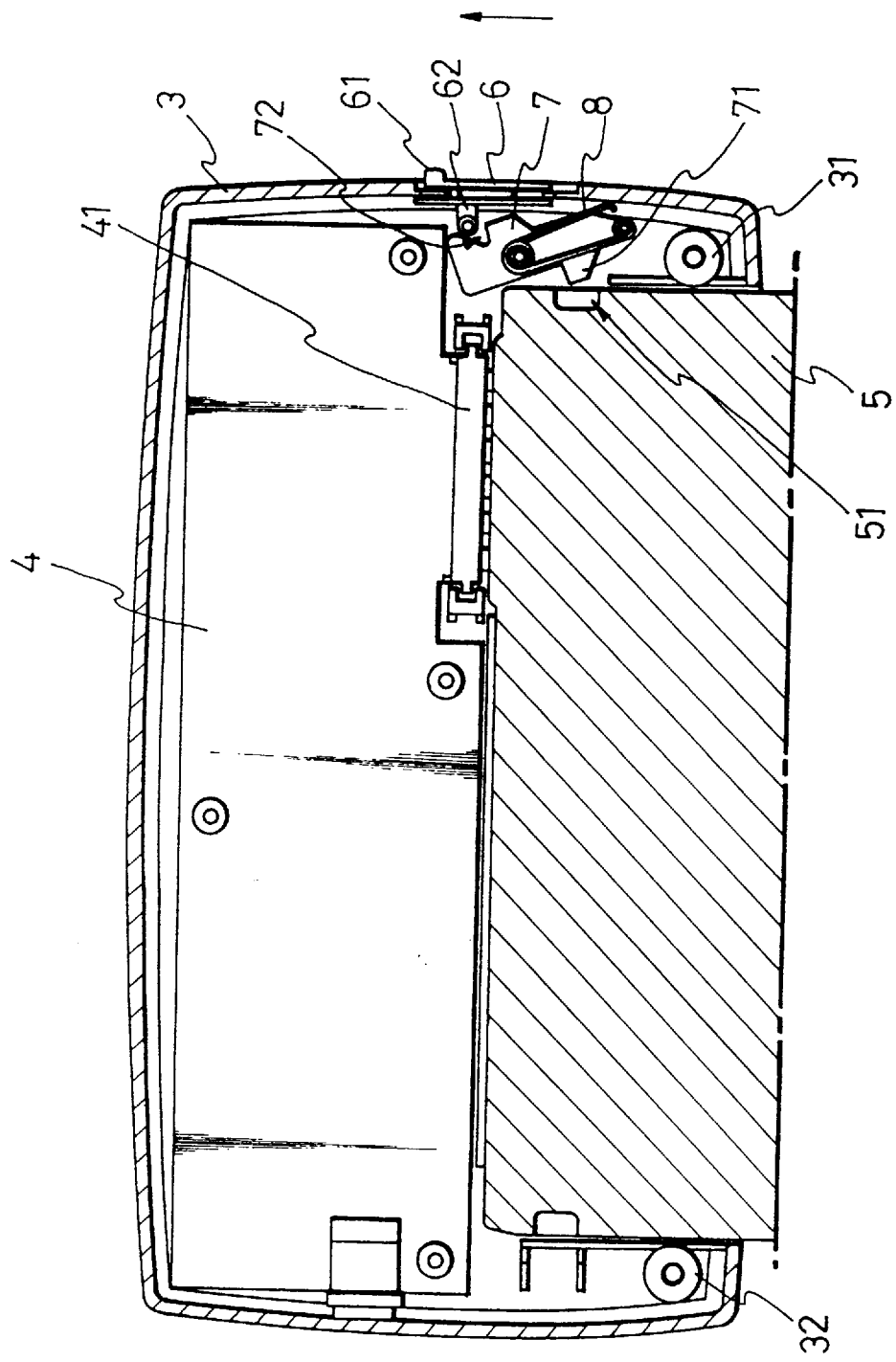
Figure 4:
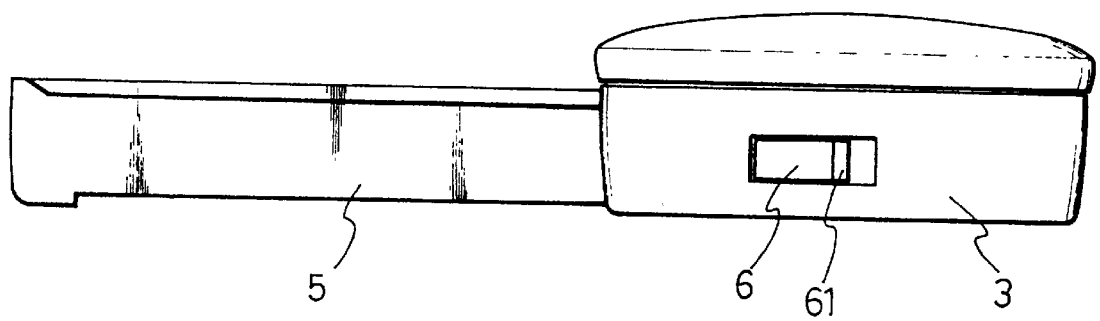
FIG. 4 is a side view showing the charging device shown in FIGS. 3A and 3B when a battery is mounted.
Figure 5:
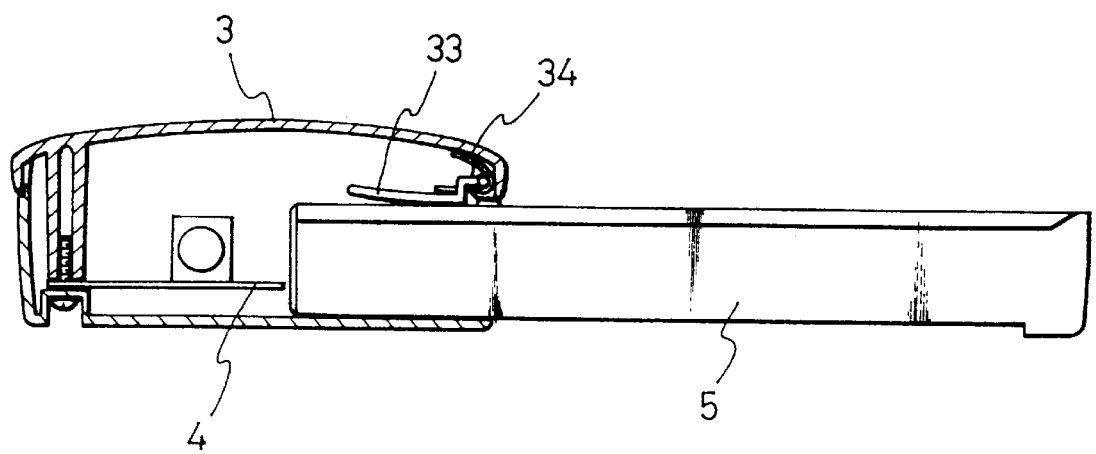
FIG. 5 is a side perspective view showing the charging device shown in FIGS. 3A and 3B with the door opened when a battery is mounted.

FIGS. 3A and 3B are top cross-sectional views showing the charging device in accordance with a preferred embodiment of the present invention when mounting and dismounting a battery. FIG. 4 is a side view showing the charging device shown in FIGS. 3A and 3B when a battery is mounted, and FIG. 5 is a side perspective view showing the charging device shown in FIGS. 3A and 3B with the door opened when a battery is mounted.

First, the construction of the charging device in accordance with a preferred embodiment of the present invention with reference to the accompanying FIG. 3A will be described. The charging device in accordance with a preferred embodiment of the present invention includes a case 3, rollers 31 and 32, a charger 4, an electrode terminal 41, a sliding part 6, a locking member 7 and a spring 8.

The charger 4 is located at a predetermined location in the case 3 and converts AC power to DC power. The electrode terminal 41 is formed as the contact part of the charger 4 for battery 5 in order to supply the DC power to battery 5. The locking member 7 is located in the space surrounded by the charger 4, the battery 5 and a case 3 and located near the center of one of the sides of the case 3. Locking member 7 can pivot at a predetermined angle. A locking projection 71 is formed on the surface of the locking member 7. The locking projection 71 engages a locking groove 51 of battery 5 when engaging battery 5. Projection groove 72 is formed on the surface of locking member 7 that faces case 3. Projection groove 72 of locking member 7 makes contacts with and cams with projection 62 of sliding part 6. Spring 8 having two ends is fixed into the pivot of the locking member 7. One end of the spring is fixed to the under side of the locking member 7 and the other end is against the inner side wall of the case 3. Accordingly, the locking member 7 receives a clockwise rotational bias by spring 8.

The projection 62 of sliding part 6 which contacts the projection groove 72 of the locking member 7, is formed in the inner side of the case 3, and a grip 61 of sliding part 6 is formed in the outer side of the case 3. Accordingly, the projection 62 moves in the same direction as the grip 61 if a user moves the grip 61. Rollers 31 and 32 are formed on both sides of the case so as to facilitate the mounting of a battery 5 into the charging device.

Next, the process of mounting the battery 5 onto the charging device with reference to the accompanying FIGS. 3A and 3B will be described. If the battery 5 is inserted in the case 3, the upper left side of the battery 5 reaches the beveled portion of the locking projection 71. If the user applies a slight force to the battery 5, the upper left side of the battery 5 slides on the beveled portion of the locking projection 71 and the locking member rotates in a counterclockwise direction. If the user applies the force continuously to the battery 5, the battery 5 engages the electrode terminal 41 of the charger 4 and the locking projection 71 engages by the locking groove 51 of the battery 5 because of the biasing force of spring 8. The battery is fixed to the charging device by engaging the locking projection 71 and the locking groove 51.

Next, the process that the battery is dismounted from the charging device is explained. As shown in FIG. 3B, if the user slides the grip 61 in the direction indicated by the arrow, the projection 62 of the sliding part 6 cams with locking member 7. The locking member 7 rotates in a counterclockwise direction by the motion of the projection 62. Spring 8 is pressed out of its equilibrium position. Accordingly, the locking projection 71 of the locking member 7 slips out from the locking groove 51 of the battery 5, and the battery is separated from the electrode port 41 of the charger 4 by pulling the battery 5.

FIG. 4 is a side view showing the charging device when a battery is mounted and the grip 61 of the sliding part 6 is exposed to the exterior of the case 3. FIG. 5 is a side perspective view showing the charging device comprising a door 33 in accordance with a preferred embodiment of the present invention.

With reference to the accompanying FIG. 5, the door 33 is installed in front of the charging device so as to rotate to the internal upper side of the case 3 upon installation of battery 5. A door spring 34 is installed in the back side of the door 33, and one side of the door spring 34 is supported to the upper side of the case 3 and the other side of door spring 34 is fixed to the back side of the door 33. Accordingly, the door 33 is always shut by the elasticity of the door spring 34 when the is battery 5 is not inserted to the charging device. If the user pushes the battery 5 through the door 33, the door 33 is pushed up to an internal sidewall of the case 3. The door 33 prevents dust from entering the case of the charging device when battery 5 is not inserted to the charging device.

As the above mentioned, in accordance with a preferred embodiment of the present invention, the force of attaching battery 5 to the charging device is strengthened when the battery 5 is mounted to the charging device because the locking projection 71 of the locking member 7 engages the locking groove 51 by the force of spring 8. And, the battery is easily dismounted from the charging device by handling the grip 61 of the sliding part 6.

The door 33 is located in the front of the charging device in accordance with a preferred embodiment of the present invention and is always shut by the door spring 34 when the battery 5 is not inserted into the charging device, so dust can not enter the case of the charging device when the charging device is not being used.

What is claimed is:

1. A charging device, comprising:

a case capable of insertably receiving a battery, the battery having a locking groove on one side;

charging means installed in said case, for controlling charging the battery by converting a commercial alternating current power into a direct current power and supplying said direct current power to said battery;

a locking mechanism comprising:

a locking member rotatable installed in said case and disposed to alternately engage and disengage the locking groove by rotating in a cam-like manner, said locking member comprising:
- a locking projection engageable with the locking groove in the battery; and
- a slot on a side opposing said locking projection;

a torsion spring positioned on an axis of rotation of said locking member to bias said locking member into a position that is engaging said locking projection of said locking member with the locking groove in said battery; and a slide contactingly engaged with said slot in said locking member to rotate said locking member when an external force is applied to said slide; and said battery being insertable into said case and engaged with said locking member without application of an external force to said slide, the battery remaining locked in said charger until said slide is manipulated to disengage said locking projection of said locking member from the locking groove of said battery.

2. The device as claimed in claim 1, with said slide comprising:
- a body slidable laterally along a plane of a side of said case;
- a grip formed on an external side of said body so that said grip may be exposed to the outside; and
- a projection on an internal side of said body engaged with said slot in said locking member to dispose said locking member to rotate when said slide is moved laterally along a side of said charging device.

3. The device as claimed in claim 1, further comprising:
- a door attached to a front side of said case enabling the battery to be inserted into the charging device via said front side, said door rotating into said case when the battery is inserted into the charging device; and
- a door spring installed between a back side of said door and an inner surface of said case, biasing said door in a closed position.

4. The device as claimed in claim 3, further comprising a roller located inside said case on each side of said door to facilitate and guide the insertion of the battery into said charging device.

5. A charging device, said charging device comprising:
- a case accommodating insertion of a battery bearing a groove in one side, said case having a base and a front side, said case comprising:
  - a door attached to said front side enabling the battery to be inserted into said charging device through said front side, said door rotating into said case when the battery is inserted into the charging device; and
  - a first torsion spring positioned between an inner surface of said door and an inner surface of said case biasing said door into a closed position;
- a charger contained in said case, said charger converting alternating current power to direct current power and supplying direct current power to said battery; and
- a locking mechanism disposed inside said case, said locking mechanism, comprising:
  - a locking member rotatable attached inside said case and alternately engaging with and disengaging from said groove in the battery by rotating in a cam-like manner, said locking member comprising:
    - a locking projection engageable with the groove in said battery; and
    - a slot on a side opposing said locking projection;
  - a torsion spring positioned on an axis of rotation of said locking member to bias said locking member into a position engaging said locking projection of said locking member with said groove in the battery; and
  - a slide contactingly engaged with said slot in said locking member, rotating said locking member when an external force is applied to said slide.

6. The device in claim 5, said slide comprising:
- a body laterally slidable along the plane of a side of said case;
- a grip located on an external side of said body; and
- a projection located on an inner surface of said body, said projection engaged with said slot in said locking member to rotate said locking member when said grip of said slide is laterally moved, said locking member disengaging from the groove of in the battery when an external force is applied to said grip to allow the battery to be removed from said case.

7. The device of claim 6, said case further comprising a pair of rollers located inside said case on opposite sides of said door to facilitate and guide the insertion and removal of said battery from said charging device.

8. A charging device for a battery having a groove in a side, said charging device comprising:
- a chassis having a base, a front side, and a lateral side, said chassis comprising:
  - a door rotatably attached to said front side allowing said battery to have a distal end inserted into said charging device through said front side, said door rotating into said chassis in response to insertion of the battery while the battery is inserted into said charging device;
  - a first torsion spring biasing said door into a closed position; and
  - a pair of rollers positioned inside said chassis on opposing sides of said door to guide said battery into the charging device;
- charging means for electrically recharging said battery;
- a locking mechanism enclosed in said chassis, said locking mechanism comprising:
  - a locking member rotatably fixed proximate to said lateral side and engage said groove in said battery in a cam-like manner, said locking member comprising:
    - a body having a locking projection engaging said groove in said battery; and
    - a slot in said body substantially opposite from said locking projection;
  - a second torsion spring biasing said locking member in a position engaging said locking projection with said groove in said battery; and
  - a button slidably attached in said lateral side of said chassis, said button engaging said slot in said locking member to rotate said locking member into a position disengaging said locking projection from said groove in said battery when said button is slidably moved from an equilibrium position; and
- said chassis freely accommodating insertion of the battery into said chassis through said door, with the battery being secured inside said charging device after insertion by said locking mechanism, and with the battery being disengaged from said locking projection of said locking mechanism when said button is slidable moved from said equilibrium position.

* * * * *